United States Patent
Liu

(10) Patent No.: US 8,194,761 B2
(45) Date of Patent: Jun. 5, 2012

(54) SAMPLE CLOCK FREQUENCY OFFSET ESTIMATION IN DRM

(75) Inventor: Yan Liu, Shen Zhen (CN)

(73) Assignee: Shenzhen STS Microelectronics Co., Shenzhen (CN)

( * ) Notice: Subject to any disclaimer, the term of this patent is extended or adjusted under 35 U.S.C. 154(b) by 1104 days.

(21) Appl. No.: 12/079,937

(22) Filed: Mar. 28, 2008

(65) Prior Publication Data

US 2008/0279313 A1    Nov. 13, 2008

(30) Foreign Application Priority Data

Mar. 29, 2007  (CN) .......................... 2007 1 0089038

(51) Int. Cl.
*H04L 27/28*    (2006.01)
(52) U.S. Cl. ........ 375/260; 375/259; 375/261; 375/267; 375/322; 375/346; 370/203; 370/208; 370/310
(58) Field of Classification Search .................. 375/220, 375/259, 260, 262, 267, 271, 292, 299, 311, 375/316, 343, 346, 350, 261, 278, 285, 295, 375/320, 322, 344
See application file for complete search history.

(56) References Cited

U.S. PATENT DOCUMENTS

| | | | | |
|---|---|---|---|---|
| 6,628,730 B1* | 9/2003 | Stott et al. ..................... | 375/344 |
| 7,573,953 B2* | 8/2009 | Lee ................................ | 375/326 |
| 7,702,024 B2* | 4/2010 | Kim et al. ..................... | 375/260 |
| 7,940,849 B1* | 5/2011 | Fang et al. .................... | 375/260 |
| 2005/0036564 A1* | 2/2005 | Peter et al. .................... | 375/260 |
| 2005/0175113 A1* | 8/2005 | Okuyama ...................... | 375/260 |
| 2006/0039515 A1* | 2/2006 | Lee et al. ...................... | 375/355 |
| 2007/0041312 A1* | 2/2007 | Kim .............................. | 370/208 |
| 2008/0212727 A1* | 9/2008 | Jahan et al. ................... | 375/350 |
| 2009/0285137 A1* | 11/2009 | Fujita et al. ................... | 370/310 |

\* cited by examiner

*Primary Examiner* — Hirdepal Singh

(57) ABSTRACT

A system and method for estimating sample clock frequency offset ($\epsilon_s$) in a digital radio mondiale (DRM) system such as, for example, DRM receivers. The system and method includes using a relationship given by the following equation:

$$\epsilon_s = \frac{\text{linearfit}\left(\text{angle}\left(\frac{\frac{P_{G_m}}{P_{G\_tr_m}}}{\frac{P_{G_{m\text{-}cycle}}}{P_{G\_tr_{m\text{-}cycle}}}}\right), l\right) \times N}{2\pi \times \text{cycle} \times (N + L)}$$

wherein the $P_{Gm}$ is the gain pilot received in the $m^{th}$ symbol and $P_{G\_trm}$ is the gain pilot transmitted in the $m^{th}$ symbol, the $P_{Gm\text{-}cycle}$ is the gain pilot received in (m-cycle)$^{th}$ symbol, the $P_{G\_trm\text{-}cycle}$ is the second gain pilot transmitted in (m-cycle)$^{th}$ symbol, the l is the index of the sub-carrier associated with the gain pilot, the N is a factor of a sample point number of a useful symbol, the L is a sample point number of a guard interval, and the cycle is the interval of two symbols which are inserted gain pilots at the same sub-carriers (l).

19 Claims, 2 Drawing Sheets

SAMPLE CLOCK FREQUENCY OFFSET ESTIMATION IN DRM

CROSS-REFERENCE TO RELATED APPLICATION AND CLAIM OF PRIORITY

The present application claims the benefit under 35 U.S.C. §119(a) of a Chinese Patent Application filed in the Chinese Intellectual Property Office on Mar. 29, 2007 and assigned Serial No. 2007-10089038.0, the entire disclosure of which is hereby incorporated by reference.

TECHNICAL FIELD

This disclosure is generally directed to digital radio mondiale (DRM) receivers and in particular to DRM receiver clock synchronization.

BACKGROUND

Transmitted digital radio mondiale (DRM) signals include a succession of orthogonal frequency-division multiplexing (OFDM) symbols. Each OFDM symbol is the sum of K sine wave portions equally spaced in frequency. Each sine wave portion, called a "cell", is transmitted with a given amplitude and phase that corresponds to a carrier position. A certain number of cells in each OFDM symbol are transmitted with a predetermined amplitude and phase and are referred to as "reference pilots."

Reference pilots represent a certain proportion of the total number of cells. These cells are pilot cells for channel estimation and synchronization. The positions, amplitudes and phases of these cells are carefully chosen to optimize the performance, especially the initial synchronization duration and reliability. Generally, there are three types of reference cells used in DRM: frequency pilot cells, time pilot cells and gain pilot cells.

OFDM systems generally rely upon two conditions. First, the transmitted carriers and the demodulating carriers should be aligned with each other. In the second condition, the receiver performs an integrate-and-dump process over a duration equal to the reciprocal of the carrier spacing. Under these conditions, signal orthogonality holds and there is no crosstalk between carriers. If either of the two conditions does not hold, then orthogonality does not hold. Thus, some degree of crosstalk between carriers inevitably results. An error in the receiver clock frequency will cause the spacing of the demodulating carriers to differ from those transmitted. In addition, errors in the receiver clock frequency cause the duration of the receiver integrate-and-dump process to differ from the reciprocal of the transmitted carrier spacing resulting in significant crosstalk between the carriers.

The error caused by clock frequency offsets in OFDM is related to the offset and the number of sub-carriers. As the offset is increased or the number of sub-carriers is increased, the error increases. The number of sub-carriers is different for each robustness mode and frequency occupancy mode of DRM, Table 1 lists the sub-carrier number in each mode of DRM.

TABLE 1

| Robustness | Spectrum Occupancy | | | | | |
|---|---|---|---|---|---|---|
| Mode | 0 | 1 | 2 | 3 | 4 | 5 |
| A | 101 | 113 | 205 | 229 | 413 | 461 |
| B | 91 | 103 | 183 | 207 | 367 | 411 |

TABLE 1-continued

| Robustness | Spectrum Occupancy | | | | | |
|---|---|---|---|---|---|---|
| Mode | 0 | 1 | 2 | 3 | 4 | 5 |
| C | — | — | — | 139 | — | 281 |
| D | — | — | — | 89 | — | 179 |

If the stability of the receiver clock is 100 ppm, then in a worst case scenario, there should be about a 200 ppm error if it is assumed that the receiver clock stability is the same as the transmitter clock. In most cases, however, it can be assumed that there is generally better clock quality. Continuing with the example, in this condition, the worst case inter-carrier interference (dB) for each DRM mode caused by clock frequency offset between transmitter and receiver is measured and is shown in TABLE 2.

TABLE 2

| Robustness | Spectrum Occupancy | | | | | |
|---|---|---|---|---|---|---|
| Mode | 0 | 1 | 2 | 3 | 4 | 5 |
| A | 35.917 | 34.862 | 29.373 | 28.362 | 23.028 | 22.039 |
| B | 36.893 | 35.732 | 30.415 | 29.284 | 24.091 | 23.071 |
| C | — | — | — | 32.937 | — | 26.506 |
| D | — | — | — | 37.100 | — | 30.616 |

One example is shown in FIG. 3, an exemplary illustration 300 of a plot of the subcarrier versus the carrier 302 to inter-carrier interference (C/ICI) ratio 304. More specifically, FIG. 3 illustrates the C/ICI ratio for each of the 170 sub-carriers of robustness mode D and spectrum occupancy mode 5 for $\epsilon=1.0002$ (or a 200 ppm error in sampling frequency). Accordingly, some action should be taken in the receiver part to correct such clock frequency offset in order to ensure the received program quality.

Conventional methods for clock frequency offset estimation often use pilot-assisted or time synchronization based methods. Conventional digital radio mondiale (DRM) receiver applications such as, for example, in DREAM software receivers, use pilot-assisted clock frequency offset estimation methods that uses three frequency pilots inserted into each of the orthogonal frequency-division multiplexing (OFDM) symbols. The receiver calculates the difference between two pilot frequencies and relates the difference to the desired pilot frequency. Such methods, however, exhibit a very high variance in the sample clock frequency estimation. In addition, often when DRM is used in, for example, mid-frequency/high-frequency (MF/HF) broadcasts, the received signals propagate from a poor channel condition thus the estimation result is in variably unsatisfactory.

Conventional time synchronization based clock frequency offset estimation methods typically account for the number of samples between two time indicators as shown in FIG. 1. For example, FIG. 1 illustrates system 100 where OFDM cells or symbols 102a, 102b and 102c (sometimes collectively referred to herein as OFDM symbol 102) and reference or sample points $N_{recorded}$ 104 and $N_{expected}$ 106. The clock frequency offset may be calculated according to the recorded sample number, $N_{recorded}$ 104, and expected sample number, $N_{expected}$ 106, as shown in the relationship exemplified by Equation 1 below.

$$\frac{T'_s - T_s}{T_s} = \frac{N_{expected}}{N_{recorded}} - 1 \qquad \text{(Eqn. 1)}$$

In Equation 1, $T_S$ is defined as the sample interval of the transmitter (similarly, $T_S'$ is the sample interval of the receiver). Although FIG. 1 illustrates one possible relationship between $N_{recorded}$ 104 and $N_{expected}$ 106, it should be understood, however, that other relationships between $N_{recorded}$ 104 and $N_{expected}$ 106 may be found by, for example, using any suitable number of samples and/or symbols 102. Generally, to achieve greater accuracy, a longer observation time is required, rather than just one OFDM symbol duration (e.g., tens of symbols may be observed). However, when longer observation times are employed, the corresponding synchronization delay is greater.

There is therefore a need in the art for improved methods for sample clock frequency offset estimation in DRM.

SUMMARY

This disclosure provides digital radio mondiale (DRM) sample clock frequency offset estimation systems and methods using pilots in the DRM system to realize clock synchronization.

In one embodiment, the present disclosure provides a method of calculating an estimated sampling frequency offset ($\epsilon_s$) in a DRM system. The method includes using a relationship between first gain pilots ($P_{Gm}$ and $P_{Gm\text{-}cycle}$) received in a symbol (m and m-cycle) and second gain pilots ($P_{G\_trm}$ and $P_{G\_trm\text{-}cycle}$) transmitted in the symbol (m and m-cycle) to calculate the estimated sampling frequency offset ($\epsilon_s$).

In another embodiment, the present disclosure provides an integrated chip for estimating sampling frequency offset. The integrated chip includes a circuit using a relationship between first gain pilots ($P_{Gm}$ and $P_{Gm\text{-}cycle}$) received in a symbol (m and m-cycle) and second gain pilots ($P_{G\_trm}$ and $P_{G\_trm\text{-}cycle}$) transmitted in the symbol (m and m-cycle) to calculate an estimated sampling frequency offset ($\epsilon_s$).

In still another embodiment, the present disclosure provides a method for calculating an estimated sampling frequency offset ($\epsilon_s$) for use in a digital radio mondiale (DRM) system. The method includes using a relationship given by a linear fit relationship between a ratio of the first gain pilot ($P_{Gm}$ and $P_{Gm\text{-}cycle}$) and a second gain pilot ($P_{G\_trm}$ and $P_{G\_trm}$-cycle) associated with a particular subcarrier index (l).

BRIEF DESCRIPTION OF THE DRAWINGS

Other technical features may be readily apparent to one skilled in the art from the following figures, descriptions and claims.

DETAILED DESCRIPTION

Figure 1:
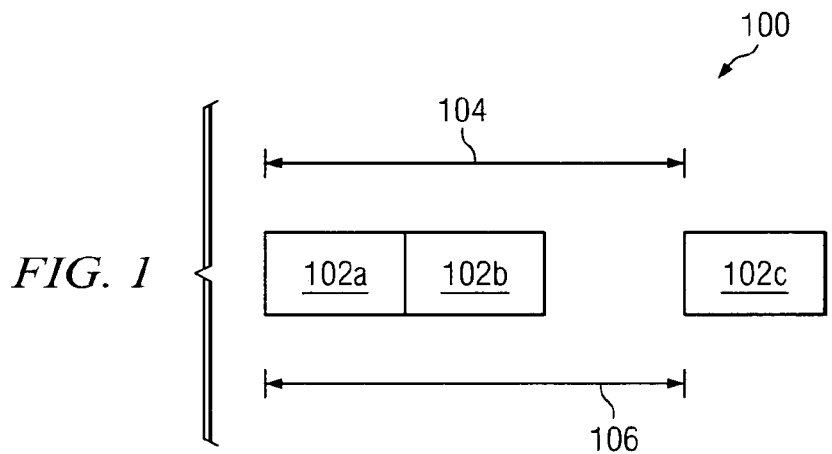
FIG. 1 illustrates time synchronization based clock frequency offset estimation accounting for a relationship between a recorded sample number and the expected sample number in a orthogonal frequency-division multiplexing (OFDM) symbol.

Referring to previously described Equation 1, and ignoring the carrier frequency offset, $T_S$ is defined as the sample interval of the transmitter (similarly, $T_S'$ is the sample interval of the receiver), $T_U$ as the duration of the useful symbol of the transmitter (similarly, $T_U'$ is the duration of the useful symbol of the receiver), and $T_G$ as the duration of the guard interval of the transmitter (similarly, $T_G'$ is the duration of the guard interval of the receiver), T as the duration of the OFDM symbol of the transmitter (similarly, T' is the duration of the OFDM symbol of the receiver), $\omega_U$ as radian frequency interval of sub-carrier of transmitter (similarly, $\omega_U'$ is the radian frequency interval of sub-carrier of the receiver), N as the number of the sample point of the useful part, L as the number of the sample point of the time guard.

The relationships between the above-defined variables are listed below and are collectively referred to herein as Equation 2.

$$\left. \begin{aligned} T_U &= NT_S \\ T_G &= LT_S \\ T &= T_U + T_G = (N+L)T_S \\ T_U' &= NT_S' \\ T_G' &= LT_S' \\ T' &= (N+L)T_S' \\ \omega_U &= \frac{2\pi}{T_U} = \frac{2\pi}{NT_S} \\ \omega_U' &= \frac{2\pi}{T_U'} = \frac{2\pi}{NT_S'} \end{aligned} \right\} \quad \text{(Eqn. 2)}$$

Thereafter, assuming that the radio frequency is $\omega_0$, the transmitted signal expression may be shown by Equation 3, and similarly, the received signal expression may be shown by Equation 4.

$$s(t) = \sum_{k=0}^{N-1} S_{k,m} e^{j(\omega_0 t + k\omega_U(t-mT))} \text{ where } mT \; m+1)T \quad \text{(Eqn. 3)}$$

$$r(t) = \sum_{k=0}^{N-1} H_{k,m} S_{k,m} e^{j(\omega_0 t + k\omega_U(t-mT))} \text{ where } mT \; m+1)T \quad \text{(Eqn. 4)}$$

In Equations 3 and 4, $H_{k,m}$ is the channel attenuate at the kth sub-carrier of the $m^{th}$ symbol. Now, in the receiver, the OFDM demodulation at the lth sub-carrier of $m^{th}$ symbol is shown by Equation 5 below.

$$Y_{l,m} = \frac{1}{T_U'} \int_{mT'}^{mT'+T_U'} r(t) e^{-j(\omega_0 t + l\omega_U'(t-mT'))} dt \quad \text{(Eqn. 5)}$$

Equation 6 results from substituting the value of r(t) from Equation 4 into Equation 5.

$$Y_{l,m} = \quad \text{(Eqn. 6)}$$

$$\sum_{k=0}^{N-1} H_{k,m} S_{k,m} e^{-jk m \omega_U T + jl m \omega_U' T'} \frac{1}{T_U'} \int_{mT'}^{mT'+T_U'} e^{j(k\omega_U - l\omega_U')t} dt$$

Then, substituting the relationship given by Equations 2 above, Equation 6 simplifies to Equation 7.

$$Y_{l,m} = \sum_{k=0}^{N-1} H_{k,m} S_{k,m} e^{-j(k-l)m\frac{2\pi(N+L)}{N}} \frac{1}{T'_U} \int_{mT'}^{mT'+T'_U} e^{j(k\omega_U - l\omega'_U)t} dt \quad \text{(Eqn. 7)}$$

Using the relationship given by Equation 8 in Equation 7, Equation 9 results.

$$I = \frac{1}{\tau}\int_T^{T+\tau} e^{jxt} dt = e^{jx\left(T+\frac{\tau}{2}\right)} \text{sinc}\left(\frac{x\tau}{2\pi}\right) \quad \text{(Eqn. 8)}$$

$$Y_{l,m} = \sum_{k=0}^{N-1} H_{k,m} S_{k,m} e^{-j(k-l)m\frac{2\pi(N+L)}{N}} e^{j(k\omega_U - l\omega'_U)\left(mT' + \frac{T'_U}{2}\right)} \text{sinc}\left(\frac{(k\omega_U - l\omega'_U)T'_U}{2\pi}\right) \quad \text{(Eqn. 9)}$$

Substituting some of the known relationships as shown above in Equation 2, Equation 10 eventually results.

$$Y_{l,m} = \sum_{k=0}^{N-1} H_{k,m} S_{k,m} e^{j2\pi km \frac{N+L}{N}\left(\frac{T'_S}{T_S} - 1\right)} e^{j\pi\left(k\frac{T'_S}{T_S} - l\right)} \text{sinc}\left(k\frac{T'_S}{T_S} - l\right) \quad \text{(Eqn. 10)}$$

The clock frequency offset is given by Equation 11. Substituting it in Equation 10, Equation 12 results.

$$\varepsilon_S = \frac{T'_S - T_S}{T_S} = \frac{T'_S}{T_S} - 1 \quad \text{(Eqn. 11)}$$

$$Y_{l,m} = \sum_{k=0}^{N-1} H_{k,m} S_{k,m} e^{j2\pi km\frac{N+L}{N}\varepsilon_S} e^{j\pi(k(\varepsilon_S+1)-l)} \text{sinc}(k(\varepsilon_S+1)-l) \quad \text{(Eqn. 12)}$$

Now, because es is generally less than one (i.e., $\varepsilon_s \ll 1$) then Equation 12 simplifies to Equation 13, and then Equation 14 results.

$$Y_{l,m} \approx H_{l,m} S_{l,m} e^{j2\pi lm\frac{N+L}{N}\varepsilon_S} e^{j\pi(l(\varepsilon_S+1)-l)} \text{sinc}(l(\varepsilon_S+1)-l) \quad \text{(Eqn. 13)}$$

$$\approx H_{l,m} S_{l,m} e^{j\pi l \varepsilon_S \left(1 + 2m\frac{N+L}{N}\right)}$$

$$\frac{\left(\frac{Y_{l,m+x}}{S_{l,m+x}}\right)}{\left(\frac{Y_{l,m}}{S_{l,m}}\right)} = \frac{\left(\frac{H_{l,m+x} S_{l,m+x} e^{j\pi l \varepsilon_S \left(1+2(m+x)\frac{N+L}{N}\right)}}{S_{l,m+x}}\right)}{\left(\frac{H_{l,m} S_{l,m} e^{j\pi l \varepsilon_S \left(1+2m\frac{N+L}{N}\right)}}{S_{l,m}}\right)} \quad \text{(Eqn. 14)}$$

$$= \frac{(H_{l,m+x})}{(H_{l,m})} e^{j2\pi l \varepsilon_S x \frac{N+L}{N}}$$

Figure 2:
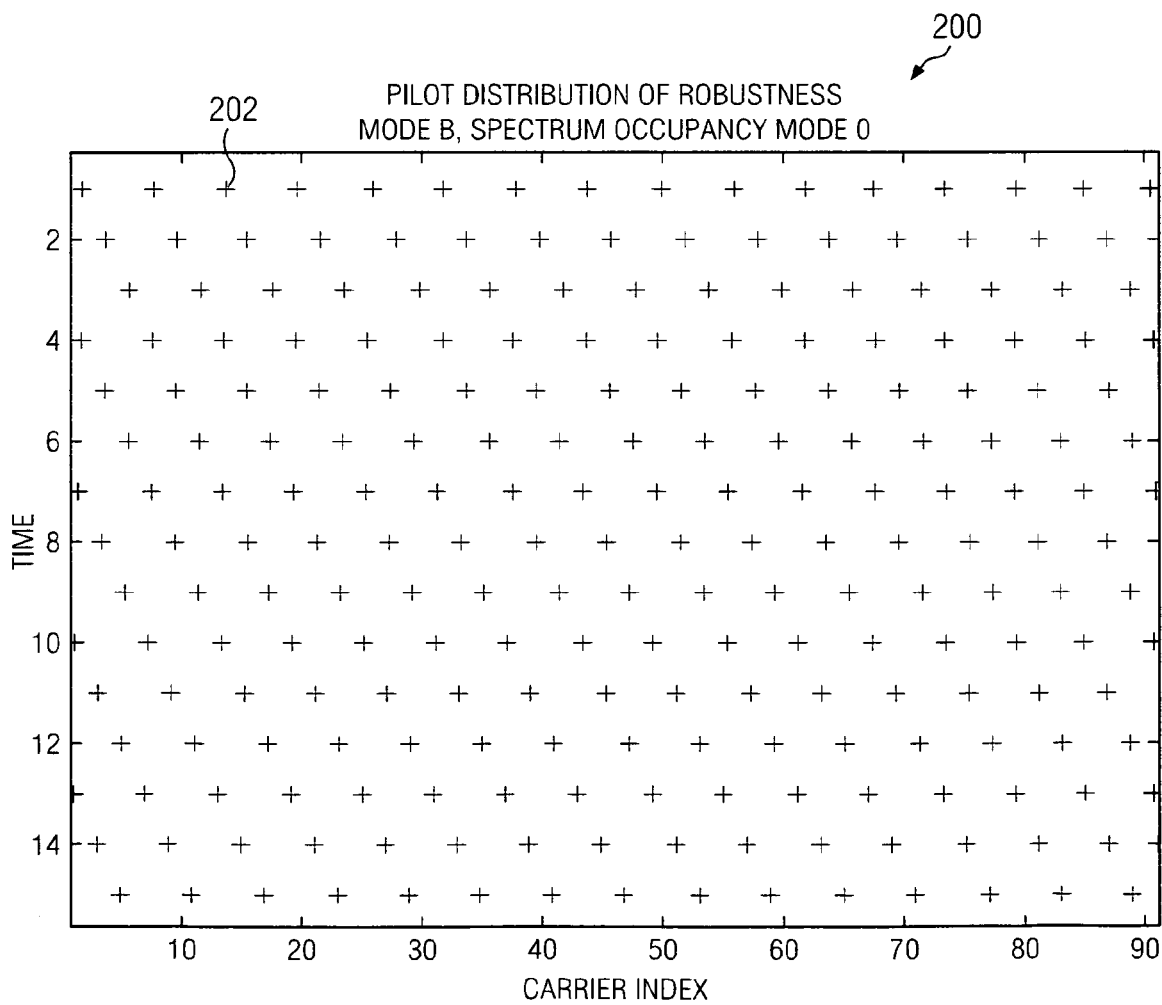
FIG. 2 is an exemplary illustration of the pilot distribution in the time and frequency domain when in a robustness mode B and when in the spectrum occupancy mode 0.
Figure 3:
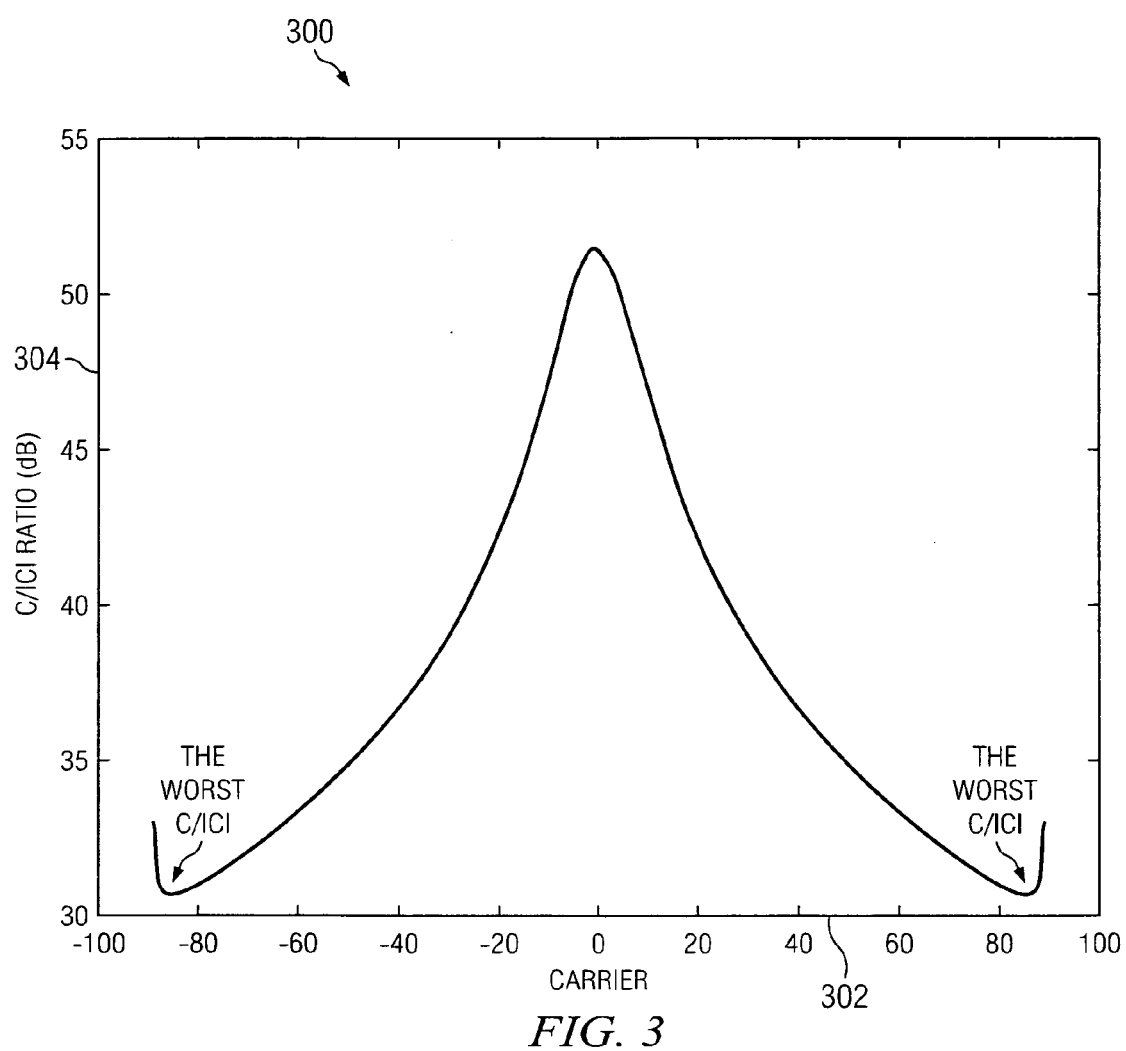
FIG. 3 is an exemplary illustration of a plot of the subcarrier versus the C/ICI ratio for each of the 170 sub-carriers of robustness mode D and spectrum occupancy mode 5 for $\epsilon=1.0002$ (or a 200 ppm error in sampling frequency).

In DRM system, the pattern of gain pilots inserted in (m+cycle)th symbol is same as the pattern of gain pilots inserted in mth symbol. Referring now to plot 200 in FIG. 2, gain pilots 202 in DRM systems are uniformly distributed in the time and frequency domains. The pilot distribution 200 of robustness mode B and frequency occupancy mode 0 is shown in FIG. 2 where the gain pilots 202 are graphically represented as stars, other robustness and frequency occupancy mode is similar. The cycle depends on the robustness mode as shown in Table 3

TABLE 3

| | Robustness mode | | | |
|---|---|---|---|---|
| | A | B | C | D |
| cycle | 5 | 3 | 2 | 3 |

Analysis focus on information modulated on lth sub-carrier where gain pilot is inserted and assuming the channel is slowly variable (i.e., $H_{l,m+cycle} = H_{l,m}$), the relationship found in Equations 15a and 15b result.

$$\frac{\left(\frac{P_{G_{l,m+cycle}}}{P_{G\_tr_{l,m+cycle}}}\right)}{\left(\frac{P_{G_{l,m}}}{P_{G\_tr_{l,m}}}\right)} = \frac{\left(\frac{H_{l,m+cycle} P_{G\_tr_{l,m+cycle}} e^{j\pi l \varepsilon_S \left(1+2(m+cycle)\frac{N+L}{N}\right)}}{P_{G\_tr_{l,m+cycle}}}\right)}{\left(\frac{H_{l,m} P_{G\_tr_{l,m}} e^{j\pi l \varepsilon_S \left(1+2m\frac{N+L}{N}\right)}}{P_{G\_tr_{l,m}}}\right)} \quad \text{(Eqn. 15a)}$$

$$\frac{\left(\frac{P_{G_{l,m+cycle}}}{P_{G\_tr_{l,m+cycle}}}\right)}{\left(\frac{P_{G_{l,m}}}{P_{G\_tr_{l,m}}}\right)} = \frac{(H_{l,m+cycle})}{(H_{l,m})} e^{j2\pi l \varepsilon_S \, cycle \frac{N+L}{N}} = e^{j2\pi l \varepsilon_S \, cycle \frac{N+L}{N}} \quad \text{(Eqn. 15b)}$$

Equation 16 illustrates the relationship between the phase deviation between the gain pilots of the two symbols, where each has the same pattern of inserted gain pilots.

$$\left\{ \text{angle}\left(\frac{\left(\frac{P_{G_{l,m+cycle}}}{P_{G\_tr_{l,m+cycle}}}\right)}{\left(\frac{P_{G_{l,m}}}{P_{G\_tr_{l,m}}}\right)}\right)\right\} = \left(2\pi \, cycle \frac{N+L}{N} \cdot \varepsilon_S\right) \cdot l = K \cdot l \quad \text{(Eqn. 16)}$$

The difference between the phase deviation between the same sub-carriers of the two symbols with the distance of cycle−1 symbols, $$\left(2\pi \, cycle \frac{N+L}{N} \cdot \varepsilon_S\right) \cdot l,$$

is proportional to the cycle and the sub-carrier's index l. The cycle is a constant when DRM robustness mode is known as shown in Table 3. Accordingly, the slope K may be obtained by collecting the results of Equation 16 by all pilots on the frequency axis and applying a linear fit operation.

By using the phase deviation occurring at the regularly distributed gain pilots, the estimated sample clock frequency offset ($\varepsilon_s$) may be calculated as shown in Equation 17 below according to one embodiment of the present disclosure.

$$\varepsilon_s = \frac{T'_s - T_s}{T_s} = \frac{\text{linearfit}\left(\text{angle}\left(\frac{\frac{P_{G_m}}{P_{G\_tr_m}}}{\frac{P_{G_{m-cycle}}}{P_{G\_tr_{m-cycle}}}}\right), l\right) \times N}{2\pi \times cycle \times (N+L)} \quad \text{(Eqn. 17)}$$

In Equation 17, the $P_{G_m}$ is the gain pilot received in the $m^{th}$ symbol and $P_{G\_tr_m}$ is the gain pilot transmitted in the $m^{th}$ symbol, the $P_{G_{m-cycle}}$ is the gain pilot received in the (m-cycle) th symbol and $P_{G\_trm-cycle}$ is the gain pilot transmitted in the (m-cycle)$^{th}$ symbol, while 1 is the index of subcarriers associated with the gain pilots and cycle is the interval of two symbols which are inserted gain pilots at the same subcarriers. In addition, N is the number of the sample point of the useful symbol and L is the number of the sample point of the guard interval. It is noted, however that in some cases, gain pilots fall in locations which coincide with those already defined for either frequency or time pilots. In such cases, the pilots used in Equation 17 should instead be the corresponding frequency or time pilots in accordance with one embodiment of the present disclosure.

It is assumed that channel is almost invariable during the interval of two symbols which are inserted gain pilots at the same sub-carrier. Such an assumption is reasonable if the channel is slowly variable and any extra variance caused by time and frequency rectification is compensated (i.e., a suitable closed-loop time and frequency tracking structure is used).

Verification of the above described system and method is accomplished by using a real DRM signal received from the air. The simulation results shown in Table 4 indicate that the system and method according to one embodiment of the present disclosure can be used to synchronize clock frequency of a DRM receiver to that of a DRM transmitter effectively.

For example, the results indicate that the accuracy of clock frequency offset estimated by the system and method of the present disclosure are well within a desired experimental error. The channel model used in simulation was a WSSUS model described in ETSI ES 201 980 V2.1.1 (2004-06).

TABLE 4

| Smode | Fmode | Channel No. | SNR | Clock Frequency Offset | Clock Frequency Offset Estimation |
|---|---|---|---|---|---|
| A | 3 | 2 | 25 | 0.999900 | 0.99990011201886 |
|   |   | 3 | 25 | 0.999900 | 0.99990863903783 |
| B | 3 | 2 | 25 | 0.999900 | 0.99990058607743 |
|   |   | 3 | 25 | 0.999900 | 0.99990499466413 |
| C | 3 | 2 | 25 | 0.999900 | 0.99989999043796 |
|   |   | 3 | 25 | 0.999900 | 0.99990385712758 |
| D | 3 | 2 | 25 | 0.999900 | 0.99990016088826 |
|   |   | 3 | 25 | 0.999900 | 0.99990364630225 |

It should be understood that embodiments of the system and method of the present disclosure may be included as part of an integrated chip, for example in an ARM7TDMI core inside chip.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of calculating an estimated sampling frequency offset ($\epsilon_s$) in a digital radio mondiale (DRM) system, comprising:
using a relationship between a first pilot ($P_m$ and $P_{m-cycle}$) received in a symbol (m and m-cycle) and a second pilot ($P_{trm}$ and $P_{trm-cycle}$ and transmitted in the symbol (m and m-cycle) to calculate the estimated sampling frequency offset ($\epsilon_s$), wherein the relationship is given by:

$$\epsilon_s = \frac{linearfit\left(angle\left(\frac{\frac{P_m}{P_{trm}}}{\frac{P_{m-cycle}}{P_{trm-cycle}}}\right), l\right) \times N}{2\pi \times cycle \times (N + L)}$$

wherein the $P_m$ is the pilot received in the m$^{th}$ symbol and $P_{trm}$ is the pilot transmitted in the m$^{th}$ symbol, the $P_{m-cycle}$ is the pilot received in (m-cycle)$^{th}$ symbol, the $P_{trm-cycle}$ is the pilot transmitted in (m-cycle)$^{th}$ symbol, the 1 is the index of the sub-carrier associated with the pilot, the N is a factor of a sample point number of a useful symbol, the L is a sample point number of a guard interval, and the cycle is the interval of two symbols in which the pilots are inserted at the same index of the sub-carriers (I).

2. The method of claim 1, wherein the pilots are gain pilots.

3. The method of claim 1, wherein the pilots are frequency pilots.

4. The method of claim 1, wherein the pilots are time pilots.

5. The method of claim 1, further comprising:
synchronizing a clock frequency of a DRM receiver to that of a DRM transmitter.

6. The method of claim 1, wherein the symbols are orthogonal frequency-division multiplexing (OFDM) symbols.

7. An integrated chip for estimating sampling frequency offset for digital radio mondiale (DRM) applications, comprising:
a circuit configured to use a relationship between a first pilot (Pm and Pm-cycle) received in a symbol (m and m-cycle) and a second pilot (Ptrm and Ptrm-cycle) transmitted in the symbol (m and m-cycle) to calculate the estimated sampling frequency offset (Es), wherein the relationship is given by:

$$\epsilon_s = \frac{linearfit\left(angle\left(\frac{\frac{P_m}{P_{trm}}}{\frac{P_{m-cycle}}{P_{trm-cycle}}}\right), l\right) \times N}{2\pi \times cycle \times (N + L)}$$

wherein the $P_m$ is the pilot received in the m$^{th}$ symbol and $P_{trm}$ is the pilot transmitted in the m$^{th}$ symbol, the $P_{m-cycle}$ is the pilot received in (m-cycle)$^{th}$ symbol, the $P_{trm-cycle}$ is the pilot transmitted in (m-cycle)$^{th}$ symbol, the 1 is the index of the sub-carrier associated with the pilot, the N is a factor of a sample point number of a useful symbol, the L is a sample point number of a guard interval, and
the cycle is the interval of two symbols in which the pilots are inserted at the same index of the sub-carriers (I).

8. The integrated chip of claim 7, wherein the pilots are gain pilots.

9. The integrated chip of claim 7, wherein the pilots are time pilots.

10. The integrated chip of claim 7, wherein the circuit is further configured to synchronize a clock frequency of a DRM receiver to that of a DRM transmitter.

11. The integrated chip of claim 7, wherein the symbols are orthogonal frequency-division multiplexing (OFDM) symbols.

12. The integrated chip of claim 7, wherein the pilots are frequency pilots.

13. A method for calculating an estimated sampling frequency offset (Es) in a digital radio mondiale (DRM) receiver, the method comprising:

using a relationship given by a linearfit-relationship between a ratio of a first pilot (Pm and Pm-cycle) received in a symbol (m and m-cycle) and a second pilot (Ptrm and Ptrm-cycle) transmitted in the symbol (m and m-cycle) associated with a particular subcarrier (I), wherein the relationship is given by:

$$\varepsilon_s = \frac{linearfit\left(angle\left(\frac{\frac{P_m}{P_{tr_m}}}{\frac{P_{m\text{-}cycle}}{P_{trm\text{-}cycle}}}\right), l\right) \times N}{2\pi \times \text{cycle} \times (N+L)}$$

wherein the $P_m$ is the pilot received in the $m^{th}$ symbol and $P_{trm}$ is the pilot transmitted in the $m^{th}$ symbol, the $P_{m\text{-}cycle}$ is the pilot received in (m-cycle)$^{th}$ symbol, the $P_{trm\text{-}cycle}$ is the pilot transmitted in (m-cycle)$^{th}$ symbol, the l is the index of the sub-carrier associated with the pilot, the N is a factor of a sample point number of a useful symbol, the L is a sample point number of a guard interval, and the cycle is the interval of two symbols in which the pilots are inserted at the same index of the sub-carriers (I).

14. The method of claim 13, wherein the pilots are gain pilots.

15. The method of claim 13, wherein the pilots are frequency pilots.

16. The method of claim 13, wherein the pilots are time pilots.

17. The method of claim 13, wherein the estimated sampling frequency offset is used to synchronize a clock frequency of the DRM receiver to that of a DRM transmitter.

18. The method of claim 13, wherein the method is carried out in an integrated chip.

19. The method of claim 13, wherein the symbols are orthogonal frequency-division multiplexing (OFDM symbols).

* * * * *